Patented Dec. 22, 1953

2,663,667

UNITED STATES PATENT OFFICE 2,663,667

YEAST FERMENTATION PROCESS

Henry Lampson Scott, Beuchel, Ky., assignor to Brown-Forman Distillers Corporation, Louisville, Ky., a corporation of Delaware No Drawing. Application February 24, 1949, Serial No. 78,236

5 Claims. (Cl. 195—37)

This invention relates to yeast fermentation of sacchariferous mashes, and relates in particular to the fermentation of such mashes, containing congeneric organic nitrogenous matter, for production of whiskey or potable alcohol.

Cereal mashes, from which whiskey or neutral spirits are prepared by yeast fermentation, contain organic nitrogenous matter as well as other substances present in the grain from which the mash is prepared. After conversion and anaerobic fermentation with yeast, the alcohol produced is distilled from the resulting beer, and the residue from the alcohol stills, known as stillage, is used directly as a cattle food, or is evaporated to dryness, with or without screening, to produce what is known as distiller's dried grain or distiller's dried solubles. In particular, the distiller's dried solubles is known to contain proteins and vitamins but it has a disagreeable odor, and a sour, bitter taste rendering it unfit for human consumption, and heretofore has been employed merely as a cattle food. The whiskey or neutral spirits produced also has objectional tastes and odors, due to the presence of minute quantities of unknown substances, and usually aging in charred oak barrels is resorted to to improve the taste or flavor and odor of the green whiskey.

It is an object of the present invention to produce whiskey or potable alcohol from grain mashes, which, as it comes from the still, has an improved odor and flavor, and other improved characteristics.

A further object is the provision of an improvement in the yeast fermentation of cereal mashes which results in an improved alcohol yield and complete utilization by the yeast of the sugars.

Another object is the production of an improved stillage and of dried solubles produced therefrom, particularly with respect to the flavor and palatability thereof.

A further object is the production of increased quantities of organic nitrogenous material and vitamins in the anaerobic yeast fermentation of sacchariferous mashes.

The present invention is based upon my discovery that if a sufficient quantity of ammonia in easily assimilable form is supplied to the yeast during the fermentation of a mash or wort containing organic nitrogenous materials, the yeast preferentially assimilates the ammonia and does not substantially attack or break down the organic nitrogenous matter in the mash. I believe that the objectionable odor and taste, or flavor of green whiskey or neutral spirits is due in part to the presence of substances which are degradation products of the nitrogenous matter in the cereal mashes, brought about by the action of yeast or congeneric bacteria, and by maintaining an adequate supply of ammonia in easily assimilable form in the mash during the fermentation according to my invention, the formation of these degraded substances is substantially reduced or prevented. As a result, the whiskey or neutral spirits distilled from a mash fermented with an adequate supply of ammonia according to the present invention, has an improved taste and odor, compared to a typical new or green whiskey as heretofore prepared, and the occurrence of "off flavors" and offensive odors is greatly reduced. The taste of the whiskey obtained is bland, and in addition, the new whiskey has a much lower acid content, a higher ester content, and an improved aromatic or fruit odor. The quality of the whiskey may be further improved by aging in charred oak barrels, as is understood in the art. The yield of alcohol from the mash also is increased under certain conditions which will be later described, which increase may be due to complete utilization of sugars by the yeast, or to a reduction in byproducts, such as acids, from the sugar. A decrease in the residual or unhydrolized starch content of the mash at the end of the fermentation, as compared to a control fermentation, also occurs.

Furthermore, additional advantages accrue from the invention in the nature of the stillage and of the distillers dried grain and dried solubles obtained therefrom. Apparently the protein originally present in the mash is carried through the fermentation substantially intact, and in addition, the stillage and distiller's grain contain a quantity of protein or organic nitrogenous material synthesized by the yeast in the fermentation process, which increases the quantity of distiller's grain and solubles recovered from the stillage. The gain in weight of recoverable dried grain and solubles is on the order of about 10 per cent, the increase being made up largely of organic nitrogenous material, such as protein and amino acids, synthesized by the yeast from the ammonia, so that the overall organic nitrogen content increases by about thirty-five per cent. There is also an increased quantity of vitamins in the recovered solubles, and the character of the solubles is greatly changed. They have a much lighter color, an agreeable odor, and the characteristic sour, bitter taste is absent, so that the solubles become palatable to humans. Also, the ash is lower, and there are no irritating fumes produced during the drying operation.

The invention may be employed for production of an improved quality of whiskey, with concurrent increase in value and quality of recoverable distillers grain and solubles from the stillage, or may be employed primarily for synthesizing organic nitrogen from ammonia. This latter use of the invention is not limited to sacchariferous mashes of cereal origin, and therefore may be carried out with sugar solutions regardless of whether organic nitrogenous materials are originally present, because by providing an adequate supply of ammonia during the fermentation, degrading action of the yeast on the synthesized organic nitrogen compounds is prevented.

When the addition of ammonia gas to the mash is commenced during the proliferation stage, the growth of the yeast is improved, and other benefits are obtained but the yield of alcohol from the mash is not increased as compared to a control fermentation. The yeast proliferation period continues until dissolved air in the mash is consumed and this period may cover from about 12 to 24 hours. Thereafter, the fermentation takes place anaerobically to produce alcohol. By withholding the addition of ammonia until substantially the end of the proliferation period and then gradually adding the ammonia gas during the fermentation, an increase in yield of alcohol is obtained as compared to a control fermentation. In general, I have obtained good results by commencing the addition of ammonia gas about eighteen to twenty-four hours after inoculation of the mash with yeast, and I continue by adding ammonia until about the fifty-sixth hour of fermentation. Fermentation may then be continued to about sixty-four hours or until the sugar content reaches zero. Or, if desired, the addition of ammonia may be continued up to the end of the fermentation.

In the practice of the invention in the production of alcohol, the ammonia is introduced into the mash in the form of gas near the bottom of the fermenter substantially as rapidly as it can be assimilated by the yeast, avoiding an excessive rate of addition which is liable to "burn" the yeast, or increase the pH to a value favoring bacterial contamination, or cause a reduction of viability and number of the yeast cells, or the production of undesired fermentation products. It has been recognized heretofore that at a pH of about 4 or slightly higher yeast maintains its greatest activity for the production of alcohol, and the ammonia gas therefore is introduced at such a rate that the pH does not go substantially above the optimum. I have not ascertained the minimum quantity of ammonia required to obtain all the benefits of the invention. Beneficial results are obtained by the use of about one-fourth pound to one-half pound of ammonia per distillers bushel of cereal, or even higher proportions of ammonia may be added. By combining the addition of ammonia with pH control, and adding ammonia gas as rapidly as it is taken up by the mash while maintaining a pH of about 4 to 5.5 throughout the alcohol producing period of the fermentation, I obtain the principal benefits of the invention insofar as improvement in the quality of the whiskey and the quality and quantity of the distiller's grain is concerned. The quantity of protein or organic nitrogenous matter synthesized by the yeast is substantially proportional to the amount of ammonia supplied during the fermentation, and the conversion of ammonia to organic nitrogenous matter calculated as amino acid is about 86 per cent or better of theoretical yield. A small quantity of the ammonia is used to form ammonium salts of the organic acids in the mash.

It is known that yeast has the power to fix ammonia during its proliferation, and heretofore it has been proposed to supply ammonia in various forms to stimulate yeast growth. Ammonia is far superior to ammonium salts or other organic or inorganic nitrogenous compounds as a source of nitrogen for yeast and provides the source of readily assimilable nitrogen for the yeast in the practice of the invention. By introducing the ammonia in gaseous form to the yeast at the bottom of the fermenter, the ammonia is made so readily available to the yeast without agitation as to result in the preferential assimilation of the ammonia by the yeast, leaving organic nitrogenous compounds originally present or synthesized in the mash substantially intact. An additional advantage in the use of ammonia gas over ammonia salts is that the consumption of the ammonia does not release any acid, and thus there is no need to add insoluble antiacid materials, such as powdered calcium carbonate, to maintain the required pH. Such materials are objectionable in the manufacture of alcohol because they form scale in the stills and increase the ash content of the dried grain and dried solubles. The addition of aqua ammonia to an anaerobic fermentation is not practical because agitation would be required, and the ammonia liquor as well as the agitation would introduce air into the fermentation mass, which would result in a reduction in yield of alcohol, because the presence of air would promote proliferation at the expense of sugar. A further advantage in the use of ammonia gas as compared to aqua ammonia is that no water is introduced into the mash, and thus the problem and expense of evaporating additional water in the production of dried solubles from the stillage is not encountered. The addition of ammonia gas at the bottom of the vat requires no agitation, and the rate of introduction of gas is easily controlled. If desired, the addition of the gas may be controlled automatically to maintain a desired hydrogen ion concentration in the mash, as for example, by the use of an automatic pH control apparatus operating a solenoid valve through a mercury type switch.

The invention will be described in detail in connection with the following specific example.

A grain mash was prepared by cooking and malting corn and rye. The cooked mash prepared from 692½ bushels (38,780 lbs.) grain contained about 65 per cent corn, 23 per cent rye and 12 per cent malt, and was made up to about 29,085 gallons, including about 3,000 gallons stillage from a previous fermentation. After innoculation with the required quantity of yeast, (Saccharomyces cerevisiae) the mash was allowed to ferment for about eighteen hours, at which time the pH fell from 4.95 to 4.45, and introduction of ammonia gas from a compressed ammonia cylinder equipped with a pressure reducing valve through a perforated pipe near the bottom of the vat was commenced. The perforated pipe was conveniently formed in the shape of a T with ⅛ inch holes spaced about an inch apart and sufficient pressure was employed to overcome the weight of the liquid and secure the desired feed. The cell count rose steadily to about 118 million cells per cc. at 33 hours, with about 80 per cent viable, during which time 102 pounds of ammonia gas was introduced. From this point the cell count gradually subsided. A total of 217 pounds ammonia gas was introduced during the entire fermentation. The ammonia was added at such rate that the pH did not rise substantially above 4.53, and the ammonia apparently was immediately utilized by the yeast as fast as it was introduced. At no time should ammonia be added fast enough to permit the ammonia odor to be discernible at the surface, as this would increase the pH too much and would be liable to burn the yeast.

Although the pH of the mash was maintained near optimum conditions during the fermentation, there was a big increase in titratable acidity, probably due to the synthesis of amino acids by the yeast. A small part of the ammonia went to neutralize acetic, lactic and other acids produced in the fermentation, but the synthesis of organic nitrogen was substantially proportional to the amount of ammonia introduced. The cell count at the end of the fermentation at drop time was about 97 million per cc. with about 37 per cent viable. At the end of 64 hours, when the fermentation was discontinued, there was no free sugar and residual convertible starch calculated as sugar was about 3.45 g. per liter, compared to a control fermentation showing 1.30 g. per liter sugar and 4.25 g. per liter residual starch calculated as sugar. The yield of alcohol was 4.855 gallons per bushel, which represents an increase of about 7.3 per cent over the control fermentation.

The whiskey distilled from the mash had improved organoleptic properties. The odor was somewhat nutty and the taste was smoother than the usual raw whiskey. It contained about half the usual titratable acid and had a higher ester content, with a slightly lower fusel oil content.

The stillage remaining after distilling of the alcohol was screened, and the screenings were pressed and dried to produce dried grain. The liquid from the screening operation was concentrated and evaporated to substantial dryness to produce dried solubles. The dried solubles were golden brown, with an odor resembling fresh peanuts, although the taste did not resemble the odor. However, the taste was palatable and there was no sour, bitter taste as is usual in distiller's dried solubles.

The following tables give a comparison of the average results of two fermentations carried out according to the invention, compared to control fermentations in which there was no adidtion of ammonia.

*New whiskey analysis*

|  | Ammonia fermentation | Control fermentation | Change, percent |
|---|---|---|---|
| Proof | 103.0 | 102.9 |  |
| Acidity [1] | 3.5 | 7.6 | −54 |
| Esters [2] | 17.9 | 14.5 | +23.4 |
| Aldehydes | Trace | Trace |  |
| Fusel oil [3] | 134.2 | 136.2 | −.14 |
| Odor | Aromatic | Yeasty |  |
| Taste | Bland—no offensive tastes | Harsh |  |

[1] Grams of acid per hundred liters of whiskey, expressed as acetic acid.
[2] Grams per hundred liters of whiskey calculated as ethyl acetate.
[3] Grams per hundred liters of whiskey calculated as amyl alcohols.

*Dried grain and solubles*

| | Grain Mash 1,385 bu. | | Ammonia 472.5 lbs. |
|---|---|---|---|
| | Dried solubles | Dried drain (screenings) | Total weight |
| Recovered lbs | 12,800 | 14,500 | 27,300 |
| Average increase lbs | 612 | 2,035 | 2,645 |
| Percent gross increase | 3 | 16.3 | 10 |
| Nitrogenous matter lbs | 4,100 | 3,915 | 8,015 |
| Weight increase | 1,300 | 797 | 2,097 |
| Percent increase | 46 | 25 | 35 |

*Dry basis, solubles*

| | Percent |
|---|---|
| Total nitrogen increase | 37.3 |
| Ammoniacal nitrogen | 4.1 |
| True organic nitrogen | 33.2 |
| Av. organic nitrogen in control | 20.8 |
| Increase, organic nitrogen | 12.4 |

The dried distiller's solubles also shown an increase in certain vitamin content over that obtained from the control fermentation, as shown by the following table:

| | Micrograms per gram | | Percent Increase |
|---|---|---|---|
| | Control process | Ammonia process | |
| Riboflavin | 11.6 | 13.1 | 12.9 |
| Niacin | 79.5 | 86.6 | 8.8 |
| Pantothenic acid (as calcium pantothenate) | 20.5 | 25.3 | 22.8 |
| Biotin | .26 | .33 | 26.9 |
| Folic acid | 2.2 | 2.3 | 4.5 |
| Choline (as choline chloride) | 4,100 | 4,500 | 9.8 |

For some reason I am unable to explain, there is a slight decrease in vitamin B₁ in the solubles produced from a fermentation carried out according to the invention. On the basis of present day costs, the value of the increase in weight of the dried solubles and distiller's grain alone more than offsets the cost of ammonia consumed in the fermentation.

The process of the invention produces raw whiskey or potable alcohol of a superior quality, which so far as I am aware, has never been attained or equalled, even by the most accurately controlled rectification, and upon aging in charred oak barrels or by other methods, the quality is even further improved. At the same time an increased quantity of enriched by-products are obtained. Because of the palatability of the dried solubles, their suitability in human foods is increased, and further processing may be resorted to for special uses.

I claim as my invention:

1. The process of making alcohol and nitrogenous compounds which comprises: preparing a cereal mash, inoculating said mash with yeast; allowing the yeast to proliferate under aerobic conditions; fermenting the mash under anaerobic conditions; and introducing gaseous ammonia into the mash commencing near the end of the proliferation period and continuing the addition of gaseous ammonia during the fermentation period at a rate controlled to maintain the pH of the mash within a range extending from about 4.0 to 5.5 over said period.

2. The method of synthesizing organic nitrogenous compounds from ammonia which comprises: gradually introducing ammonia gas into a cereal mash during the yeast-alcohol fermentation of the mash at a rate controlled to maintain the pH of the mash during the fermentation period within a range extending from about 4.0 to 5.5 over said period; and then recovering organic nitrogenous compounds from the mash.

3. An improvement in the process of anaerobically proliferating yeast in a cereal mash containing organic nitrogenous matter and then conducting the anaerobic yeast-alcohol fermentation of the mash, comprising: introducing gaseous ammonia into the mash near the end of the proliferating period and continuing the introduction during the fermentation period at a rate controlled to maintain the pH of the mash within a range extending from about 4.0 to about 5.5 substantially over the entire fermentation period.

4. An improvement in the anaerobic yeast-alcohol fermentation of cereal mashes comprising: introducing gaseous ammonia into the anaerobic mash during the fermentation period at a rate controlled to maintain the pH of the mash within a range extending from about 4.0 to about 5.5 substantially over the entire fermentation period.

5. The improvement of claim 4 wherein: the gas is gradually introduced in the proportion of about ¼ to ½ pound of ammonia per bushel of cereal.

HENRY LAMPSON SCOTT.

References Cited in the file of this patent

UNITED STATES PATENTS

| Number | Name | Date |
| --- | --- | --- |
| 1,449,127 | Nilsson | Mar. 20, 1923 |
| 1,511,754 | Connstein | Oct. 14, 1924 |
| 1,718,910 | Lavedan | June 25, 1929 |